United States Patent
Kirisken (10) Patent No.: US 10,824,448 B2
(45) Date of Patent: Nov. 3, 2020

(54) METHOD FOR SELECTIVE BLOCKING OF NOTIFICATIONS DURING A PREDEFINED USAGE OF A PROCESSOR DEVICE

(71) Applicant: Vestel Elektronik Sanayi ve Ticaret A. S., Manisa (TR)

(72) Inventor: Barbaros Kirisken, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 0 days.

(21) Appl. No.: 16/306,348

(22) PCT Filed: Jun. 8, 2017

(86) PCT No.: PCT/EP2017/063983
§ 371 (c)(1),
(2) Date: Nov. 30, 2018

(87) PCT Pub. No.: WO2017/211962
PCT Pub. Date: Dec. 14, 2017

(65) Prior Publication Data
US 2019/0332447 A1 Oct. 31, 2019

(30) Foreign Application Priority Data
Jun. 9, 2016 (EP) .................................... 16173711

(51) Int. Cl.
*G06F 9/451* (2018.01)
*A63F 13/211* (2014.01)
(Continued)

(52) U.S. Cl.
CPC ............ *G06F 9/451* (2018.02); *A63F 13/211* (2014.09); *A63F 13/214* (2014.09); *G06F 3/011* (2013.01);
(Continued)

(58) Field of Classification Search
None
See application file for complete search history.

(56) References Cited

U.S. PATENT DOCUMENTS

2011/0131274 A1   6/2011   Hille
2014/0240122 A1   8/2014   Roberts et al.
(Continued)

FOREIGN PATENT DOCUMENTS

GB            2384569 A   *   1/2003

OTHER PUBLICATIONS

The International Search Report (ISR) for PCT/EP2017/063983 dated Sep. 11, 2017, pp. 1-4.
(Continued)

*Primary Examiner* — Syed A Roni
(74) *Attorney, Agent, or Firm* — McDonnell Boehnen Hulbert & Berghoff LLP (57) ABSTRACT

The present invention refers to a method for suppressing notifications during usage of a processor device by a user, wherein the processor device at least comprises an information outputting unit for outputting information to the user and an information inputting unit for inputting information by a user. The inventive method at least comprises the steps: detecting an interaction value representing user inputs in a predefined time; detecting a priority value, wherein the priority value is at least computed from the interaction value and the predefined time; comparing the determined priority value with a list of pre-set values or pre-set value ranges, wherein each pre-set value or pre-set value range represents a priority level, wherein each priority level suppresses one or more predefined or definable types of notifications; suppressing notifications in dependency of the determined priority value.

7 Claims, 6 Drawing Sheets

(51) Int. Cl.
*A63F 13/214* (2014.01)
*G06F 3/01* (2006.01)
*G06F 3/0488* (2013.01)
*G06F 9/54* (2006.01)

(52) U.S. Cl.
CPC .......... *G06F 3/017* (2013.01); *G06F 3/04883* (2013.01); *G06F 9/542* (2013.01); *A63F 2300/105* (2013.01); *A63F 2300/1068* (2013.01)

(56) References Cited

U.S. PATENT DOCUMENTS

2014/0344375 A1 11/2014 Hauser et al.
2016/0117202 A1* 4/2016 Zamer

OTHER PUBLICATIONS

Written Opinion of the International Searching Authority for PCT/EP2017/063983 dated Sep. 11, 2017, pp. 1-6.

* cited by examiner

| 601 | 602  | 603  |
|-----|------|------|
| 604 | 602a | 603a |
| 301 | 602b | 603a |
| 303 | 602c | 603a |
| 502 | 602d | 603a |
| 503 | 602d | 603a |
| 605 | 602e | 603b |

Fig. 4

$$M[k] = \frac{1}{N}\sum_{n=k}^{N+k} x[n] + \frac{1}{N}\sum_{n=k}^{N+k} y[n] + \frac{1}{N}\sum_{n=k}^{N+k} z[n]$$

Fig. 5a $$T = L1\ldots + LN + R1\ldots + RN$$

METHOD FOR SELECTIVE BLOCKING OF NOTIFICATIONS DURING A PREDEFINED USAGE OF A PROCESSOR DEVICE

CROSS-REFERENCE TO RELATED APPLICATION

This application is a U.S. national phase of International Application No. PCT/EP2017/063983, filed Jun. 8, 2017, which claims priority to European Patent Application No. 16173711.9, filed Jun. 9, 2016, both of which are incorporated by reference herein in their entirety.

The present invention relates according to claim 1 to a method for suppressing notifications during usage of a processor device by a user and according to claim 10 to a computer program product for executing such a method.

BACKGROUND OF THE INVENTION

Document U.S. Pat. No. 8,548,431A1 discloses notification techniques. In an implementation, an unlock screen is displayed by a mobile communications device that indicates that one or more keys of the mobile communications device are locked. If an input is detected at the mobile communications device to remove the lock, an animation is displayed that gives an appearance that the unlock screen is a page that is being turned and removing the lock of the one or more keys.

Document US20160014257A1 discloses a system and method for providing telephony functions for operation during a computer game application execution. In the disclosure, a mobile telephony user interface is provided and operated in conjunction with a computer game user interface presenting a game environment to a gamer. Mobile telephony operations are provided by way of the mobile telephony user interface in a manner that at least substantially avoids interrupting gamer perception of ongoing game play and gamer interaction with the game environment.

Document U.S. Pat. No. 6,573,824B1 discloses a combination of a paging and gaming system and apparatus enabling a user to utilize a pager to play an electronic game while waiting for a page. A centralized control station includes a page transmitter and a plurality of buttons which may be pressed individually to send a page to one of an associated plurality of game pagers. The control station also includes a game transmitter and a text generator. A game input device inputs game questions and game answers to the control station. The game questions are sent to the text generator and to a television screen or scrolling display for display to all users. The game answers ate transmitted by the game transmitter to the game pagers. Alternatively, game questions may also be transmitted to the game pagers for display on an LED display. Each user enters an answer on a keypad on the game pager, and the pager then indicates whether the entered answer was right or wrong. Other games may be fully contained within the pager. With an optional transmitter in the game pager, games may be played competitively or interactively with other users.

Document JP2006271007A discloses a communication terminal capable of easily confirming incoming call contents even during execution of a program, a method for controlling display, and a storage medium. This is executed, when a CPU recognizes the reception of a message data destined for the recipient, a game is intermitted, the game screen information at the intermission is stored in a game management table, the recipient is informed of incoming call for a predetermined time duration, and a display telling that an incoming data exists is shown on a display part. When a memory key is operated by pressing, the display telling that the incoming data exists is kept continuously shown on a corner of the screen of the display part until a reset operation is executed, and the CPU operation goes to a game control processing step.

Thus, in general push notifications from either OS or native apps or other apps can occur during game play. They can be messages, news or any other event. They annoy user while playing games like e.g. first person shooter, which need sudden actions and very high activity of the user. But they do not annoy user while in the lobby or playing strategy game. Some cited prior art systems block all notifications when an user is inside the game or game console app (IOS Game Center or Android Play Games) even in case the user is inside the lobby. The cited systems completely block all notifications when a game is open, which has important disadvantages, e.g. important calls cannot be answered or the energy management respectively the battery status of the device cannot be considered.

OBJECT OF THE INVENTION

Thus, it is the object of the present invention to provide a method and a computer program product for executing such a method on a processor device that adapts to the needs of the user.

DESCRIPTION OF THE INVENTION

The before mentioned object is solved by a method for suppressing notifications during usage of a processor device, in particular during a usage by a user, in particular a human being. The processor device hereby preferably comprises at least an information outputting means for outputting information to the user and an information inputting means for inputting information by a user. The inventive method preferably comprises at least the steps of detecting an interaction value representing user inputs in a predefined time, detecting a priority value, wherein the priority value is at least computed from the interaction value and the predefined time, comparing the determined priority value with a list of pre-set values, in particular thresholds, or pre-set value ranges, wherein each pre-set value or pre-set value range represents a priority level, wherein each priority level suppresses one or more predefined or definable types of notifications and suppressing notifications in dependency of the determined priority value.

Thus, the present invention refers to a method in particular for selectively blocking respectively suppressing of the appearance of notifications. A system executing the method preferably detects the frequency an user touches the touch screen and/or physical movements of the phone. Preferably both values are combine within a metric value, by using these values. Preferably are several comparisons done about the priority of the notification or message or phone call and delay, wherein the suppressed or blocked notifications are either delayed or completely blocked. In case notifications are delayed they are preferably delayed until a priority level is reached that allows outputting the notification to the user.

Advantageous embodiments may be configured according to any claim and/or the following specification parts.

The interaction value represents according to a preferred embodiment of the present invention a number of contacts between the user and a means for command inserting and/or a time of contact between the user and the means for command inserting. This embodiment is beneficial since each of that features can be detected in high resolution with a regular touch screen. Thus, it is possible to implement the present invention in multiple already manufactured devices e.g. in terms of modifications of the operating system respectively updates. It is also possible that the inventive method is executed by means of an executed computer program, in particular a game.

The step of determining a device movement value representing device movements detected by means of at least one sensor means in the predefined time refers to a further preferred embodiment of the present invention. The priority value is thereby preferably computed from the interaction value, the device movement value and the predefined time. This embodiment is beneficial since also the sensor means for detecting movements of the processor device are very sensitive and therefore able to detect the movement information in a high resolution. Thus, this embodiment also leads to a desired accuracy.

The subject matter of claim 1 can also be understood in such a manner that the user inputs are movements of the device. In that case the step of determining a user-touch-screen interaction value, representing the number of interactions between the user and the touchscreen or the time the user is contacting the touch screen is preferably present. The priority value is thereby preferably computed from the interaction value, the user-touchscreen interaction value and the predefined time. The most basic working principle of the invention is that the system respectively processor device performs the inventive method in such a manner that the movements of the user hand/s is respectively are recorded. Additionally, or as an alternative the duration of a user touching the screen is recorded. Than the duration is cumulated and an average thereof is determined. Additionally, or alternatively the movements of the processor device, in particular a mobile phone or tablet PC, is recorded and preferably also averaged.

According to a further preferred embodiment of the present invention due to the combination of said two values (interaction value and movement value) the system under active usage of the user starts to block notifications not to annoy and disturb the user. This embodiment is highly beneficial since multiple values resulting from different events are evaluated and therefore the accuracy of the resulting data is very precise. It is hereby conceivable that multiple lists of pre-set values or pre-set value ranges are provided, wherein each list of values or ranges refers to a dedicated scenario of usage.

According to a further preferred embodiment of the present invention the sensor means preferably comprises a plurality of sensor elements, in particular a gyroscope sensor and/or an acceleration sensor. This embodiment is beneficial since the movements of the processor device and also the directions of that movements can be detected.

The method according to the present invention is preferably started after the execution of a dedicated program, in particular a game, is detected, wherein the processing device executes that program.

At least three priority levels, in particular per list of values or ranges, are defined according to a further preferred embodiment of the inventive method. Preferably are due to a first priority level at least notifications of applications respectively programs, in particular available in an appstore, blocked. Due to a second priority level are at least notifications of an operating system, in particular indicating battery status, preferably blocked, and due to a third priority level are at least notifications indicating phone calls preferably blocked.

It is further conceivable that a fourth priority level is provided, wherein no notifications are blocked, due to the high priority of that notifications. Additional priority levels are also possible.

According to a further preferred embodiment of the present invention the processor device is a smart phone, tablet PC, console or a smart watch. Thus, the invention is related to mobile devices in particular mobile devices able to run games.

The present invention is also directed to a computer program product for executing a method according to any of the preceding claims.

Thus, the inventive method respectively system preferably first checks whether a specific program, in particular a game application, is active or not. If it is active it keeps percentage of touch vs non-touch duration with a time window, also it records physical movements of phone from gyroscope and/or accelerometer, it creates another metric value from these movements. These two values representing touch duration and physical movements are then combined to create another metric value.

On the other hand, the inventive method or system also prioritizes notification according to importance. For example, news is less important than message, and incoming calls has e.g. the highest importance.

The priority of multiple types of notifications preferably can be set or modified or predefined. The method respectively system compares metric value with some thresholds respectively priority values so it blocks or delays notifications according to one or more metric values. So if game needs high user interaction such as FPS some notifications are blocked or delayed, during high activity parts.

Further benefits, goals and features of the present invention will be described by the following specification of the attached figures, in which exemplarily components of the invention are illustrated. Components of the devices and methods according to the inventions, which match at least essentially with respect to their function can be marked with the same reference sign, wherein such components do not have to be marked or described in all figures.

In the following the invention is just exemplarily described with respect to the attached figures.

Figure 1A:
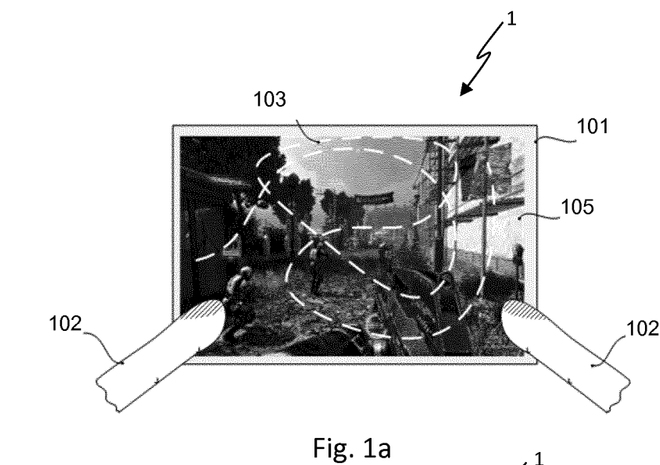
FIG. 1a-1c are showing different active situations respectively alternative situations during game play.

FIG. 1 shows a processor device 1 in a schematic illustration. The processor device has a touch screen 101. A program, in particular a game, is executed on that processor device 1 and the game play is preferably displayed on that touch screen 101. Reference number 102 indicates fingers of at least one user. At least one of that fingers 102 is moved along the touch screen 101 for causing an interaction within the game. Such a path of contact between the finger 102 of the user and the touch screen 101 is indicated by reference number 103. The path of contact 103 represents an user interaction with the processor device 1 and thus enables the detection of an user activity during the usage of a program, in particular a game. Furthermore, due to the contact between the user and the touch screen 101 the duration of such an activity can be measured. It should be understood that different contact schemes can be detected and evaluated due to the present invention. One scheme e.g. can be characterized in that the contact between the user and the touch screen 101 is short (e.g. shorter than 2 sec. or shorter than 1 sec) but in a high frequency e.g. of more than 10 contacts per minute or of more than 15 contacts per minute or of more than 20 contacts per minute or of more than 30 contacts per minute. It is alternatively or additionally possible that the average duration of no contact between the user and the touch screen is e.g. shorter than 2 sec. or shorter than 2 sec. According to a further scheme the average contact duration between the user and the touch screen 101 can be more than 2 sec., in particular more than 3 sec. or more than 4 sec. It is possible that the schemes are changing rapidly. That means the user may contact the touch screen 101 with respect to the first scheme for a few seconds and afterwards according to the second scheme or a further scheme. Preferably are the before described contacts respectively interactions between the user and the touch screen 101 sensed and evaluated. Reference number 105 indicates a game play situation where user has higher activity and attention, like a FPS (first person shooter) game in the exemplary case. Alternatively, and only as example the inventive method may be applied to action games, like sport games, or games addressed to reflexes of the user.

Figure 1B:
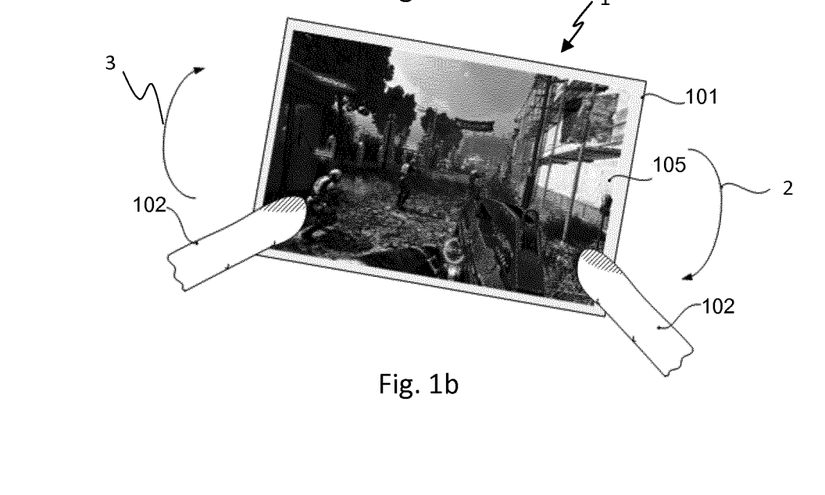

FIG. 1b shows an additional or alternative degree of freedom that can be sensed and evaluated. That degree of freedom is a movement of the processor device 1. The movement can be e.g. a tilting and/or a pivoting and/or accelerating, indicated by arrows 2 and 3. The sensing of the movements of the processor device 1 preferably take place by means of sensor means, like an acceleration sensor and/or gyroscope and/or others.

Figure 1C:
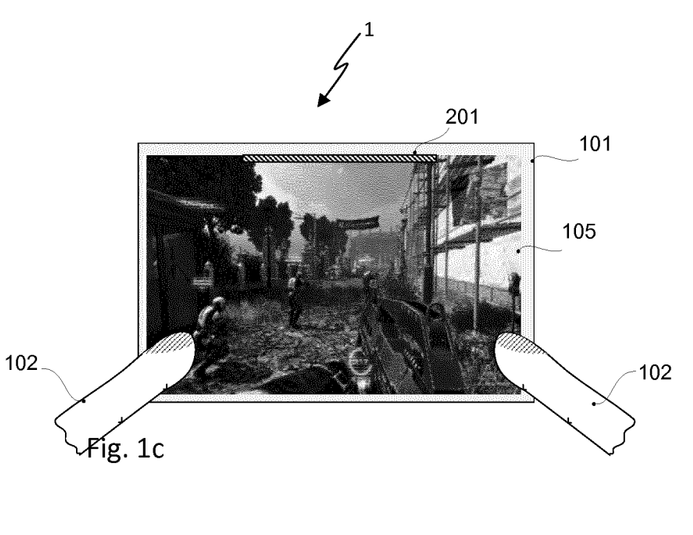

FIG. 1c shows a further scenario. In this scenario a notification 201 is blocked. That means according to the operating system or a further program a visual and/or acoustical and/or haptical (e.g. vibration) signal should have been outputted to inform the user about a specific notice, change of state, etc. The blocking or suppression of the notification can be understood as fully blocking respectively that notification or as a reduction in the visual and/or haptical and/or acoustical appearance of that notification. That means, suppressing respectively blocking can e.g. be understood as outputting a very low visual effect without annoying. Alternatively, a not attractive sound feedback is possible.

Figure 2A:
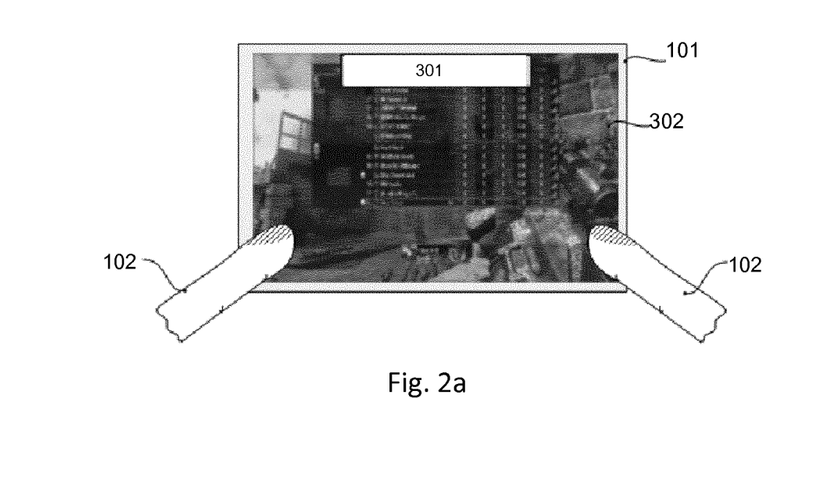
FIG. 2a-2b are showing passive situations during game play.

FIG. 2a shows a further situation in the program, in particular in the game. The program is switched from an active mode as shown in FIG. 1a-1c to a passive mode, that means the user is not required to stay focused respectively to interact with upcoming game situations immediately. In this mode the user might select parameters or options or other elements. Reference number 301 indicates that a high importance notification is shown. This notification cannot be outputted before, so it is delayed, since it was blocked respectively suppressed before, that mean during game play (cf. FIG. 1c reference number 105). Thus, screen 302 represents an in game information screen that requires relatively low and/or no immediately user interaction. Relatively low is to understood in comparison with the user activity during game play. Thus, the average user activity, in particular measured by contact between the user and the touch-screen and/or movements of the processor device, is at least 10% or at least 20% or at least 30% or at least 40% or at least 50% less in the passive mode compared to the active mode.

Figure 2B:
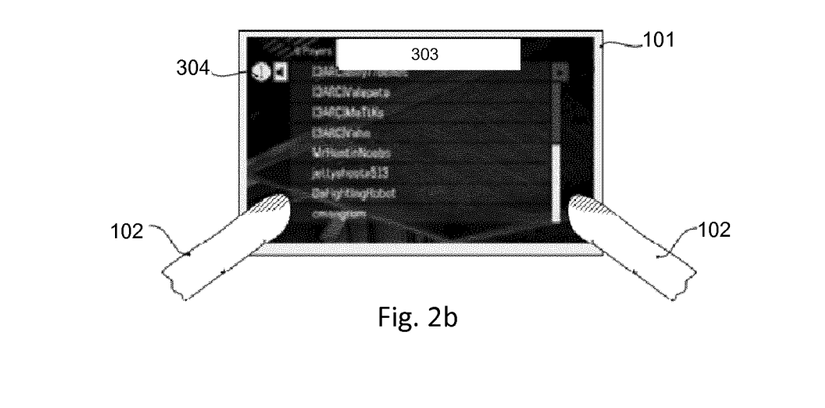

FIG. 2b shows an off game lobby or information screen 304 with relatively very low user interaction. Thus, the average user activity, in particular measured by contact between the user and the touch-screen and/or movements of the processor device, is at least 10% or at least 20% or at least 30% or at least 40% or at least 50% less in the off game lobby mode or information screen mode compared to the passive mode, in particular in game information screen mode. Reference number 303 represents a medium importance notification. This medium importance notification is shown with delay, that means not during 105 (cf. FIG. 1c) and 302 (cf. FIG. 2a).

Figure 2C:
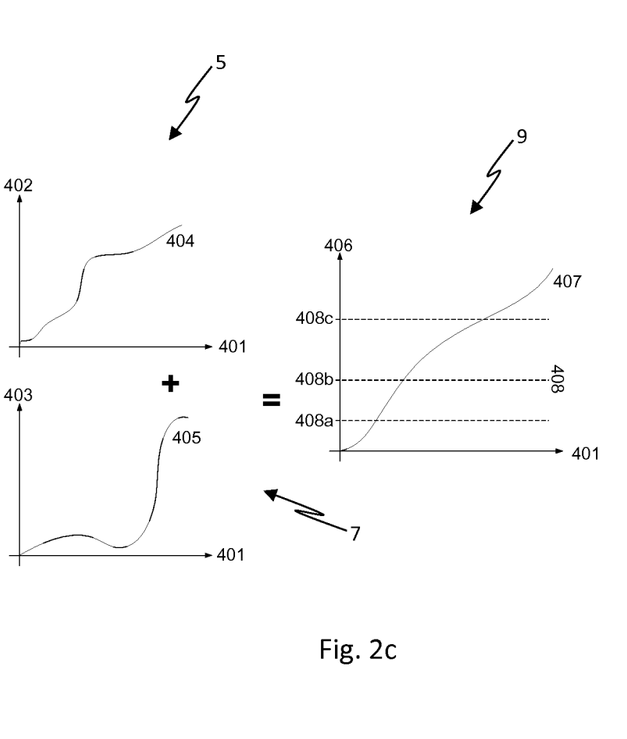
FIG. 2c shows two individual sensor values and a combination of those sensor values.

FIG. 2c shows first activity metrics 5 and second activity metrics 7. Furthermore, FIG. 2c shows a combination, in particular addition, of metrics 5 and metrics 7 resulting in combined metrics 9. The first activity metrics 5 is represented by a chart having on the horizontal axis time 401 and on the vertical axis 402 the quantity of touch interaction. Reference number 404 indicates the sensed touch interaction metric. The first activity metrics 5 is represented by a chart having on the horizontal axis time 401 and on the vertical axis 403 the quantity of device movements. Reference number 405 indicates the sensed device movement metric.

The combined chart shows that the vertical axis 406 represents a quantity of combined metric and reference number 407 represents the combined metric. It is alternatively possible that instead of the combined metric 407 only metric 404 or metric 405 is utilized for further evaluation respectively operation of the processor device, in particular judging which notification can be output in which situation. Reference numbers 408 (408a, 408b, 408c) represent different thresholds. It can be understood that threshold 408a is set respectively defined for blocking very low importance notifications and threshold 408b is set respectively defined for locking low importance and threshold 408c is set respectively defined for blocking medium importance notifications etc. Thus, it is conceivable that more thresholds are set respectively predefined. Threshold 408a defines a first priority level, wherein e.g. at least notifications of applications, in particular available in an app-store, are blocked. Threshold 408b defines a second priority level, wherein e.g. at least notifications of an operating system, in particular indicating battery status, are blocked and threshold 408c defines a third priority level, wherein e.g. at least notifications indicating phone calls are blocked.

Figure 3:
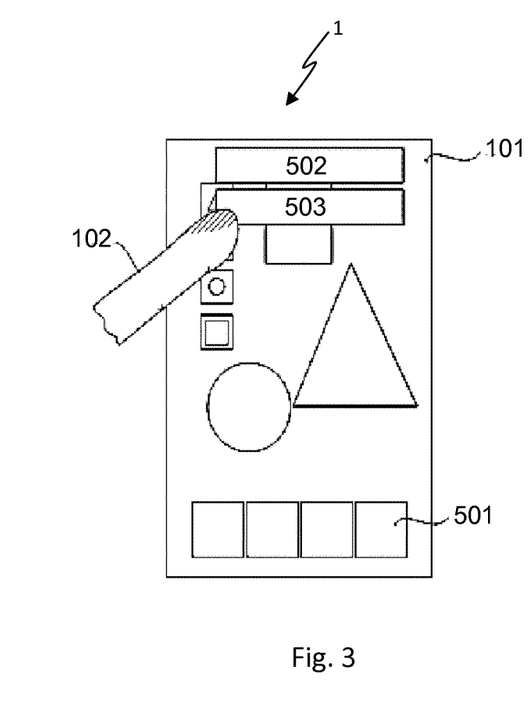
FIG. 3 shows a regular home screen of the processor device.

FIG. 3 shows a home screen 501 after return to normal usage of the processing device 1 respectively after pausing or ending game play. That home screen 501 shows one or more low important notifications 502, 503. Low importance notification 502 can be shown with delay, since it was not shown during 105 and 302 and 304 and low importance notification 503 can be shown with delay, since it was not shown during 105 and 302 and 304.

Figure 4:
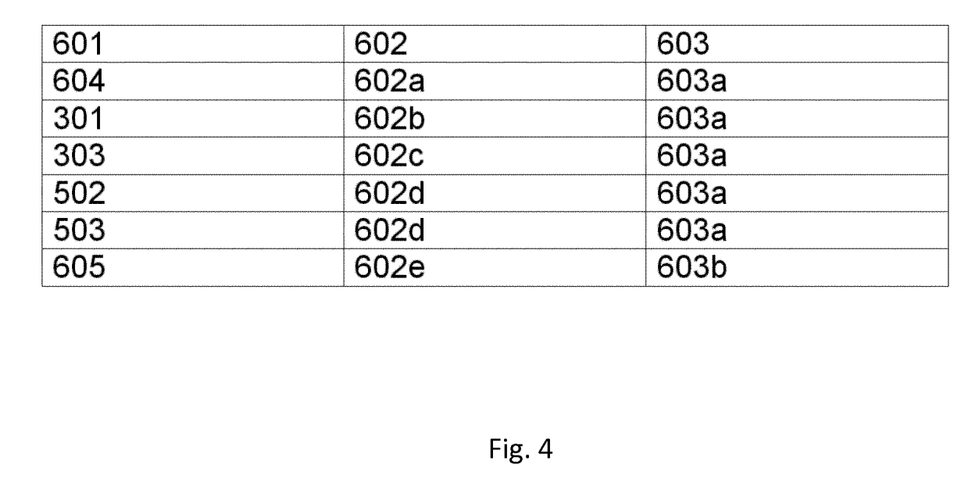
FIG. 4 shows an example of a table of incoming notifications, messages and incoming calls

FIG. 4 shows exemplary a table of incoming notifications, messages and incoming calls.

Reference number 601 represents the type and name of notification, 602 the importance of such a notification. The importance can be divided into multiple section, like 602a might represent very high importance, 602b might represent a high importance, 602c might represent a medium importance, 602d might represent a low importance, 602e might represent a very low importance. Reference number 603 represents the type of delay. In particular, 603a might represent a delay available until the lower threshold (e.g. 408a), 603b might represent that no-delay is available and completely hides notifications until the user wants to reach them, 604 might represent an incoming call and 605 might represent a status update of a social network (example).

Figure 6:
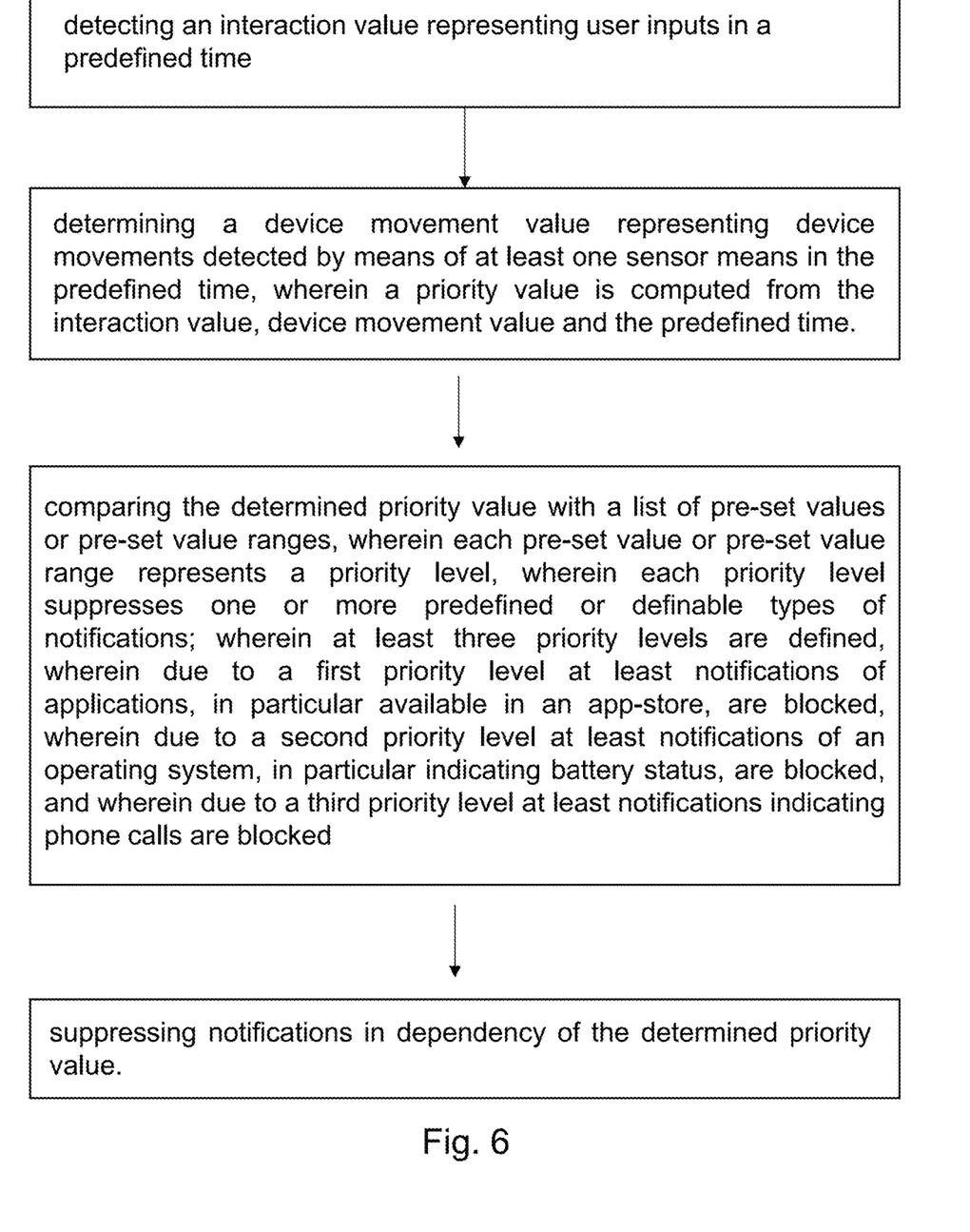
FIG. 6 shows a flow chart of the claimed invention.

Thus the second line of FIG. 6 can be understood as having an incoming call 604 that represents a very high importance 602a and is thus available up to the lower threshold 408a (cf. FIG. 2c). Alternatively, it can be set that a very high importance notification is always forwarded to the user or up to threshold 408b or 408c.

Line 3 indicates a notification 301 (cf. FIG. 2b) that has a very high importance 602b and a delay might be available until the lower threshold (e.g. 408a).

Line 4 indicates a further notification 303 (cf. FIG. 2b) that has a medium importance 602c and a delay might be available until the lower threshold (e.g. 408a).

The last line indicates notification 605 representing a status update (e.g. of a social network) and therefore has a very low importance 602e and no delay might be set, thus the notification can be completely hidden until the user wants to reach them.

Thus, the present invention refers to a method or system for suppressing notifications during usage of a processor device by a user, wherein the processor device at least comprises an information outputting means for outputting information to the user and an information inputting means for inputting information by a user. The inventive method at least comprises the steps: detecting an interaction value representing user inputs in a predefined time; detecting a priority value, wherein the priority value is at least computed from the interaction value and the predefined time; comparing the determined priority value with a list of pre-set values or pre-set value ranges, wherein each pre-set value or pre-set value range represents a priority level, wherein each priority level suppresses one or more predefined or definable types of notifications; suppressing notifications in dependency of the determined priority value.

Figure 5A:
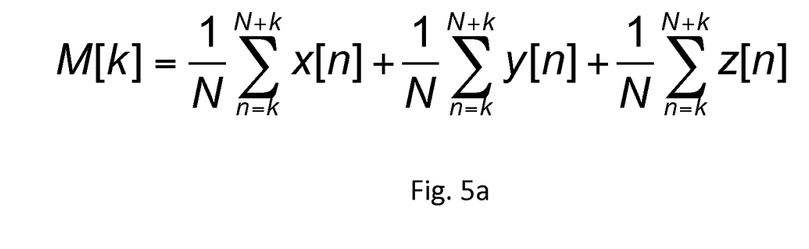
FIG. 5a shows an example for a formula for calculating gyroscope activity and FIG. 5b shows an example for a formula for calculating touch activity.

FIG. 5a shows exemplarily a formula for calculating gyroscope activity. M is the one dimensional value depending on time, it can be device movement metric (405) (shown in FIG. 2c continuous like, but it can be either continuous or discreet) N is the window size for averaging k is the value dependent on time (it can be also time in continuous time) x,y,z are the coordinates for 3D gyro, it can be reduced to 2D or 1D according to available values.

Figure 5B:
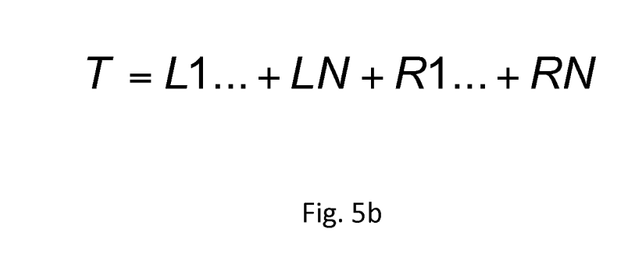

FIG. 5b shows exemplarily a formula that can be used to measure touch interactions with a metric. L's are left hand fingers and R's are right hand fingers. In most cases or preferably in all cases T is calculated with only one or two parameters (fingers) because more than two finger usage is very rear, but it is possible to use more than two fingers with below or similar formula; T is the one dimensional value depending on time (not must), it can be touch interaction metric (404) (shown in FIG. 2c continuous like, but it can be either continuous or discreet). L1 to LN represent the fingers of the left side of the screen time of duration of touch of each finger. R1 to RN represent the fingers of the right side of the screen time of duration of touch of each finger.

It has to be understood that the before mentioned formulas are mentioned only exemplarily. It is possible to replace one or both formulas with one or two or more than two other formulas. It is also conceivable to combine at least two, in particular the before mentioned formulas, according to the present invention.

| List of reference numbers | |
|---|---|
| 1 | processor device |
| 5 | first metrics |
| 7 | second metrics |
| 9 | combined metrics |
| 101 | Touch screen |
| 102 | User fingers |
| 103 | Activity, duration and path of user fingers |
| 104 | Movements of device, taken from accelerometer, gyro or similar |
| 105 | Game playing where user have higher activity and attention, a FPS game in exemplary case |
| 201 | Blocked notification, either no visual after blocking, or very low visual effect without annoying or not attractive sound feedback is possible |
| 301 | High importance notification is shown with delay (not shown during (105)) |
| 302 | In game information screen relatively low user interaction |
| 303 | Medium importance notification is shown with delay (not shown during (105 and 302)) |
| 304 | Off game lobby or information screen relatively very low user interaction |
| 401 | Time axis |
| 402 | Quantity of touch interaction |
| 403 | Quantity of device movements |
| 404 | Touch interaction metric |
| 405 | Device movement metric |
| 406 | Quantity of combined metric |
| 407 | Combined metrics (not must system also can use one of the metrics, or it can use additional metrics) |
| 408 | Thresholds |
| 408a | Blocking very low importance |
| 408b | Blocking low importance |
| 408c | Blocking medium importance etc. |
| 501 | Home screen |
| 502 | Low importance notification is shown with delay (not shown during (105 and 302 and 304)) |
| 503 | Low importance notification is shown with delay (not shown during (105 and 302 and 304)) |
| 601 | Type and name of notification |
| 602 | Importance |
| 602a | Very high importance |
| 602b | High importance |
| 602c | Medium importance |
| 602d | Low importance |
| 602e | Very low importance |
| 603 | Delay |
| 603a | Delay available until lower threshold |
| 603b | No-delay available, completely hide notification until user wants to reach |
| 604 | Incoming call |
| 605 | Status update of a social network (example) |

The invention claimed is:

1. Method for suppressing notifications during usage of a processor device by a user, wherein the processor device at least comprises:

an information outputting means for outputting information to the user and an information inputting means for inputting information by a user, wherein the method is started after an execution of a dedicated program is detected, wherein the processor device executes the dedicated program; and at least comprising the steps:

detecting an interaction value representing user inputs in a predefined time;

determining a device movement value representing device movements detected by means of at least one sensor means in the predefined time,
- wherein a priority value is computed from the interaction value, device movement value and the predefined time, comparing a determined priority value with a list of pre-set values,
- wherein each pre-set value represents a priority level,
  - wherein each priority level suppresses one or more predefined or definable types of notifications;

wherein at least three priority levels are defined,
- wherein due to a first priority level at least notifications of applications, in particular available in an app-store, are blocked,
- wherein due to a second priority level at least notifications of an operating system, in particular indicating battery status, are blocked,
- and
- wherein due to a third priority level at least notifications indicating phone calls are blocked, suppressing notifications in dependency of the determined priority value.

2. Method according to claim 1,
characterized in that
the interaction value represents
- a number of contacts between the user and a means for command inserting
- and/or
- a time of contact between the user and the means for command inserting.

3. Method according to claim 1,
characterized in that
the user inputs are movements of the device
and by the step:
- determining a user-touchscreen interaction value, representing a number of interactions between the user and the touchscreen or the time the user is contacting the touch screen,
  - wherein the priority value is computed from the interaction value, the user-touchscreen interaction value and the predefined time.

4. Method according to claim 1,
characterized in that
the at least one sensor means comprises a gyroscope sensor and/or an acceleration sensor.

5. Method according to claim 1,
characterized by
a fourth priority level, wherein no notifications are blocked, due to a high priority of that notifications.

6. Method according to claim 1,
characterized in that
the device is a smart phone, tablet personal computer (PC), a console, or a smart watch.

7. A computer program product comprising: a memory storing instructions; and one hardware processor for executing a method according to claim 1.

* * * * *